United States Patent
Daecke et al.

(10) Patent No.: US 7,852,884 B2
(45) Date of Patent: Dec. 14, 2010

(54) DEVICE AND METHOD FOR MULTIPLEXING DATA IN A COMMUNICATION SYSTEM

(75) Inventors: Dirk Martin Daecke, Munich (DE); Guenther Schauer, Unterschleissheim (DE); Armin Tannhaeuser, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 2346 days.

(21) Appl. No.: 10/182,771

(22) PCT Filed: Feb. 7, 2001

(86) PCT No.: PCT/DE01/00476

§ 371 (c)(1),
(2), (4) Date: Nov. 25, 2002

(87) PCT Pub. No.: WO01/60107

PCT Pub. Date: Aug. 16, 2001

(65) Prior Publication Data

US 2003/0174735 A1    Sep. 18, 2003

(30) Foreign Application Priority Data

Feb. 10, 2000   (DE) ................................ 100 05 793

(51) Int. Cl.
*H04J 3/12* (2006.01)
(52) U.S. Cl. ...................................................... 370/524
(58) Field of Classification Search .................. 370/509, 370/524, 264, 352, 439, 522, 437, 904, 229–231, 370/313, 321, 336, 337; 379/93.16
See application file for complete search history.

(56) References Cited

U.S. PATENT DOCUMENTS

| | | | | |
|---|---|---|---|---|
| 5,319,637 A | * | 6/1994 | Taniguchi et al. | 370/522 |
| 5,373,336 A | * | 12/1994 | Sugita | 396/439 |
| 5,708,663 A | * | 1/1998 | Wright et al. | 370/524 |
| 6,044,082 A | * | 3/2000 | Nyg.ang.rd et al. | 370/437 |
| 6,345,072 B1 | * | 2/2002 | Liu et al. | 375/222 |
| 6,400,708 B1 | * | 6/2002 | Bartholomew et al. | 370/352 |

FOREIGN PATENT DOCUMENTS

DE   19952303 A1 * 5/2001

OTHER PUBLICATIONS

XP-001014397; "SDSL—An Ideal Internet and Access for Business and Residential Users" by M.N. Huber et al.; 11-13. 101999; pp. 126-131.
XP-002169795; "Transmission and Multiplexing (TM); High Bit-rate Digital Subscriber Line (HDSL) Transmission Systems on Metallic Local Lines; HDSL Core Specification and Applications for Combined ISDN-BA and 2 048 kbits Transmission"; ETSI TS 101 135 V1.5.2; Sep. 1999.

(Continued)

*Primary Examiner*—Salman Ahmed
*Assistant Examiner*—Blanche Wong
(74) *Attorney, Agent, or Firm*—Slater & Matsil, L.L.P.

(57) ABSTRACT

According to the inventive method, data from at least one ISDN data link, at least one conventional telephone link and at least one broadband data link, respectively, are transmitted in an SDSL frame of an SDSL data link, with the required control data being transmitted in either the eoc or in one or more Z channels.

18 Claims, 5 Drawing Sheets

OTHER PUBLICATIONS

"Series G: Transmission Systems and Media, Digital Systems and Networks Digital sections and digital line system—Access networks Single-pair high-speed digital subscriber line (SHDSL) transceivers," International Telecommunication Union, ITU-T Telecommunication Standardization Sector of ITU, ITU-T Recommendation G.991.2, Feb. 2001, 174 pages.

* cited by examiner

FIG 5

| eoc message coding | Message content, byte 1 | Message content, byte 2 |
|---|---|---|
| Service ID (e.g. ISDN) | Service No. (e.g. selection of an ISDN link) | Signaling for operational purposes |

DEVICE AND METHOD FOR MULTIPLEXING DATA IN A COMMUNICATION SYSTEM

CLAIM FOR PRIORITY

This is a national stage of PCT/DE01/00476 filed on Feb. 7, 2001, which claims priority of Germany application 10005793.4 filed on Feb. 10, 2000.

TECHNICAL FIELD OF THE INVENTION

The invention relates to a system and method of communicating data.

BACKGROUND OF THE INVENTION

In a traditional ISDN basic access, a two-wire data link is exclusively used for the ISDN service (see FIG. 1). To be able to make better use of existing two-wire data links between a network node and a network termination at the subscriber, a number of services are transmitted simultaneously on one link, for example interleaved in a frame structure, in DSL (Digital Subscriber Line) links having a higher transmission rate. For the discussions following, data transport by means of an SDSL (Symmetric Digital Subscriber Line) frame is considered. It is known that within this frame, for example, the data of one or more broadband links and of one or more ISDN or one or more conventional telephony links can be transmitted. It is also known that, for these links, the information content of the operational bits can be transmitted in the eoc channel present in the SDSL frame.

SUMMARY OF THE INVENTION

The invention discloses a system and method for transmitting the operational control bits of a data link.

In one embodiment of the invention, the information content of the operational bits of links of the data frame can also be processed and transmitted at the correct time especially in those applications in which accelerated processing and transmission of the operational information is required.

The transmission of the call control in one or more Z channels requires little time, as a result of which time-critical features such as, for example, calling line identification presentation can be transmitted at the correct time even when a large number of telephony calls are simultaneously transmitted.

BRIEF DESCRIPTION OF THE DRAWINGS

Further special features of the invention will be found in the subsequent, more detailed explanations of the exemplary embodiments and in the drawings, in which:

FIG. 5 shows an addressing field.

DETAILED DESCRIPTION OF THE PREFERRED EMBODIMENTS

Figure 1:
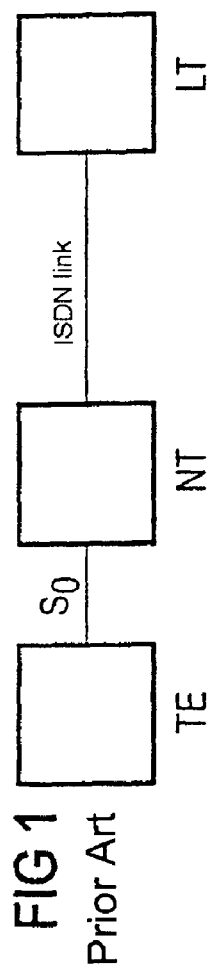
FIG. 1 shows an embodiment of an ISDN link.

FIG. 1 illustrates an ISDN link between a terminal (TE) and a network node line terminating unit (LT). Between a line terminating unit (LT) constructed, in particular, as a switching node and a network terminating unit (NT) arranged at the subscriber, two-wire connecting lines are used.

Figure 2:
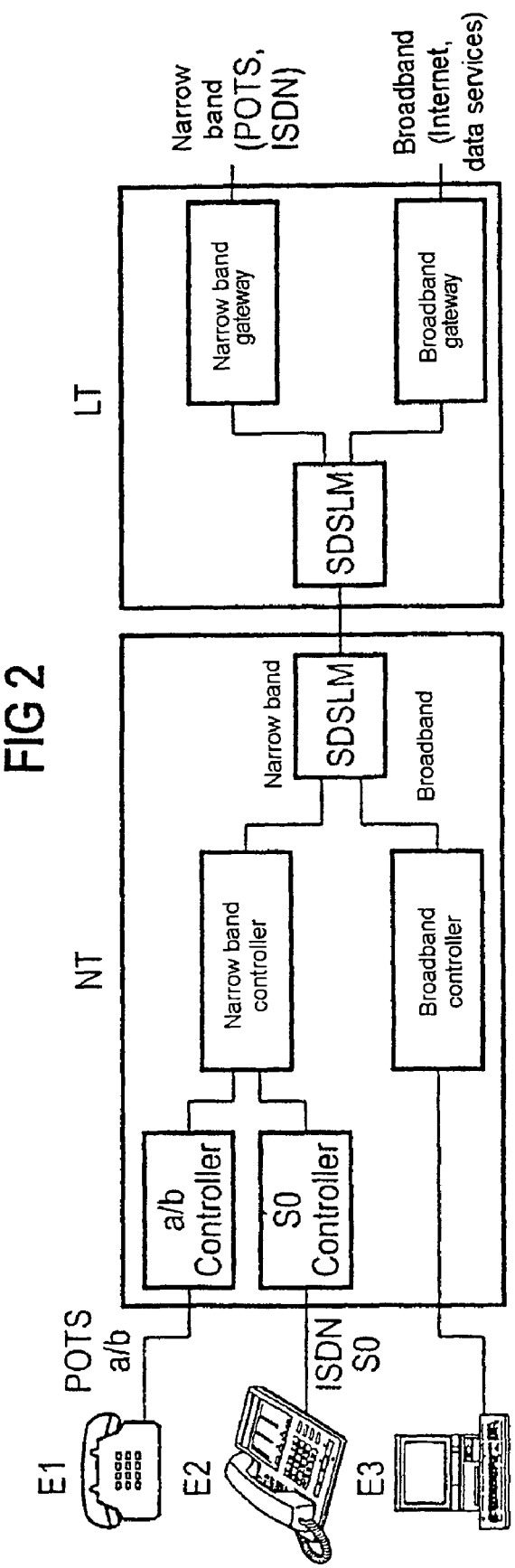
FIG. 2 shows an embodiment of an SDSL network termination.

FIG. 2 shows an SDSL link between a second network terminating unit (NT), a network node LT and terminals E1, E2 and E3. In the network node (LT), the data for the terminals are supplied or taken, respectively, from a narrow band and broadband network via corresponding gateways and are combined in the SDSL frame. The narrow band and broadband data of the SDSL frame are transmitted synchronously in time-division multiplex between a first line terminating unit (LT) and the network terminating unit (NT). The combining at the transmitting end and the splitting up at the receiving end of the data belonging to the narrow band or/and broadband network is performed in accordance with the known methods of digital time-division multiplexing in the SDSLM module which can also be referred to as a transceiver. In the network terminating unit (NT), the broadband data are forwarded to a broadband controller. The narrow band data are forwarded to a narrow band controller which forwards the relevant data to the downstream a/b controller for the conventional telephone connection or to the $S_0$ controller for the ISDN connection.

The network terminating unit (NT) can be connected to one or more broadband terminals and one or more ISDN systems or, respectively, one or more conventional telephone sets. Each individual telephony, ISDN or broadband link is in each case associated with its own a/b, $S_0$ or broadband controller.

By way of example, the terminal type E1 is a conventional telephone, the terminal type E2, as an alternative, is an ISDN system and the terminal type E3 can be a data processing system.

Figure 3:
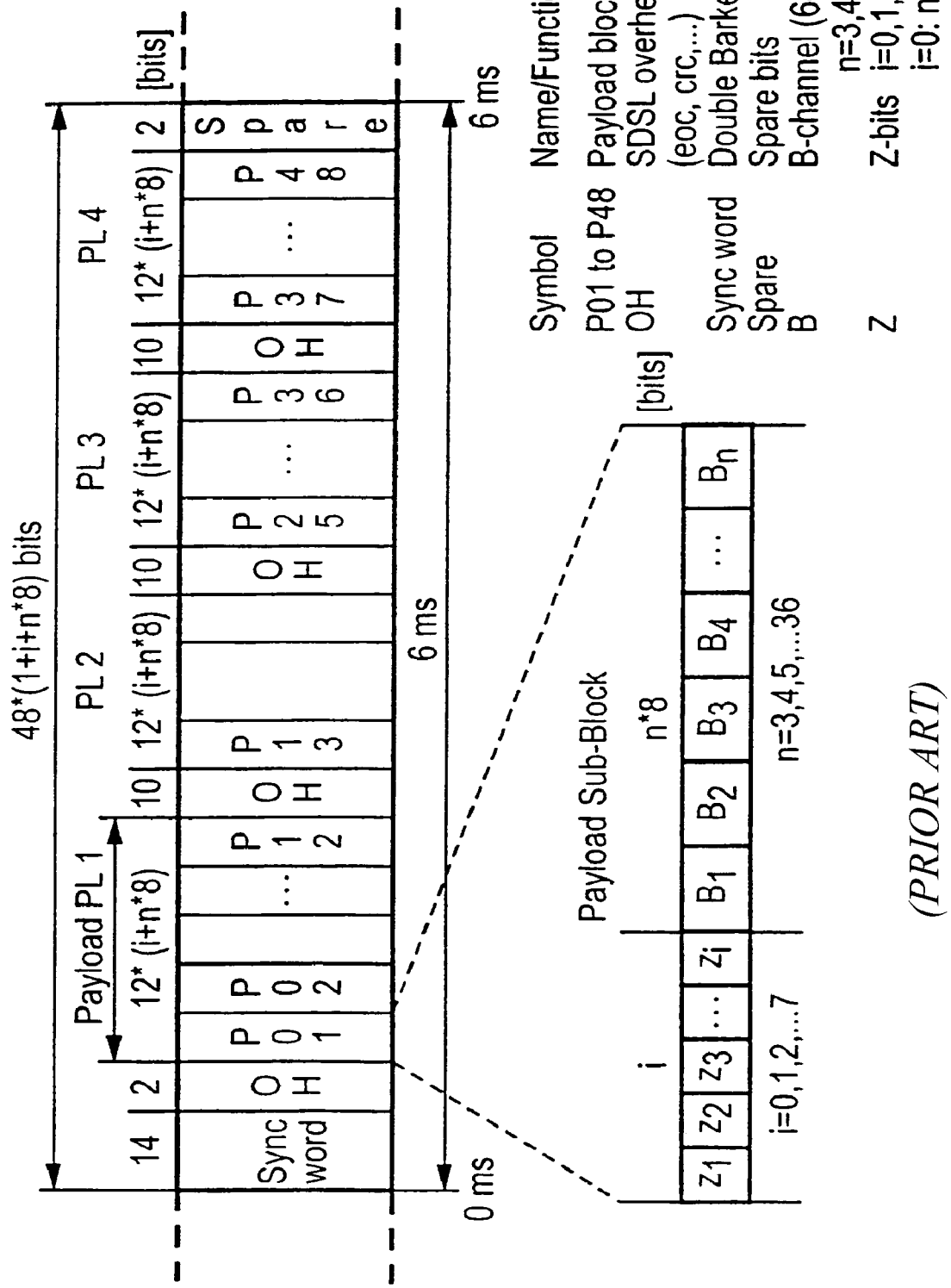
FIG. 3 shows the structure of an SDSL frame.

FIG. 3 shows the previously known structure of an SDSL frame. The SDSL frame is subdivided into preferably four payload blocks PL1, PL2, PL3 and PL4.

Each payload block PL1, PL2, PL3, PL4 can be subdivided into 12 subblocks P01 to P12, P13 to P24, P25 to P36 and P37 to P48. Each subblock can be subdivided into 1 to 8 Z channels having in each case 8 kbit/s and 3 to 36 B channels having in each case 64 kbit/s.

Figure 4:
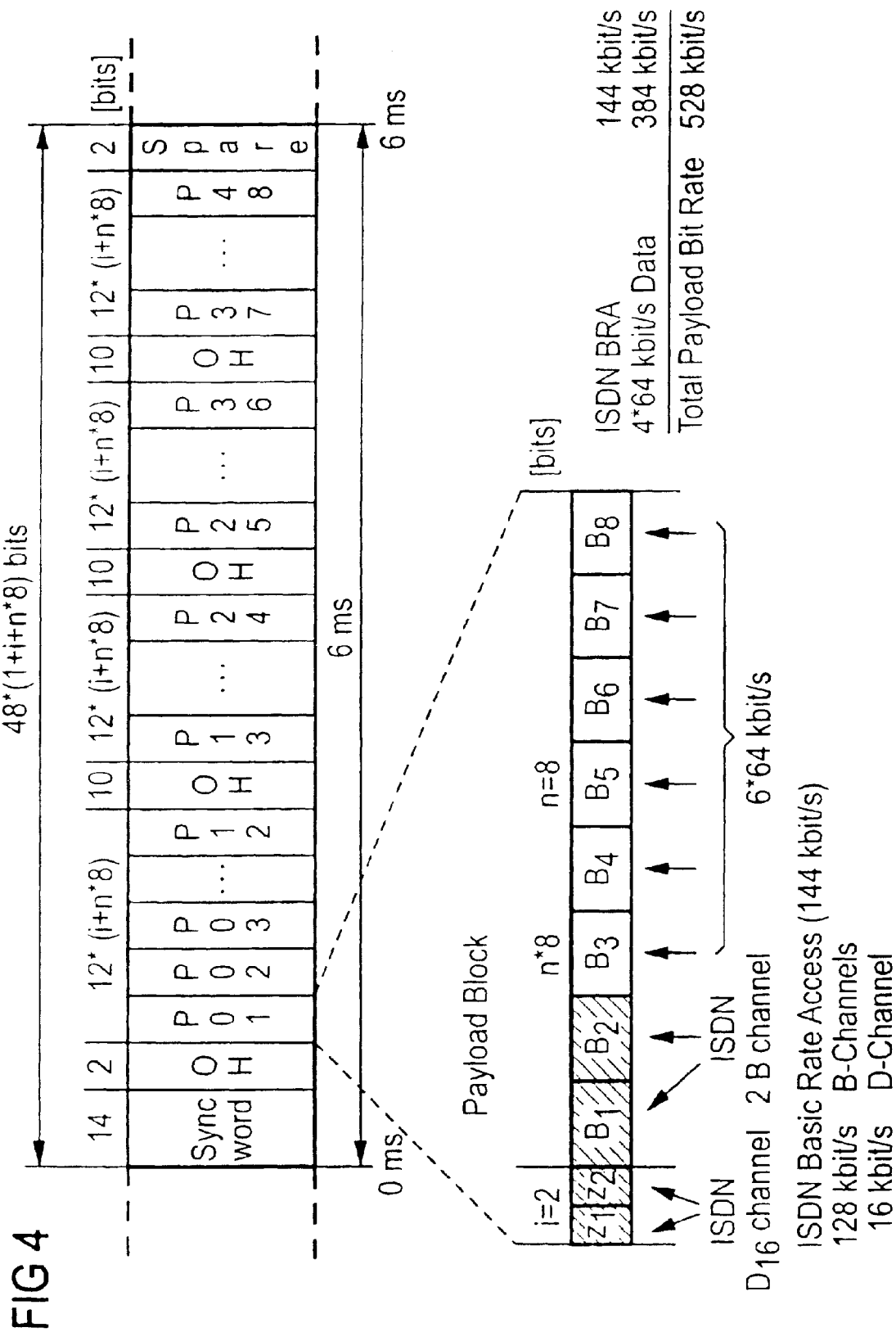
FIG. 4 shows an exemplary embodiment of the structure of an SDSL frame.

FIG. 4 shows by way of example a frame structure for a utilization of an ISDN link. The data of the B1 and B2 channels of an ISDN link are preferably combined in two 64 kbit/s B channels of an SDSL connection and the signaling data of the D channel are combined in two 8 kbit/s Z channels. The remaining area of the subblocks of the SDSL frame is used for further payload data from, for example, a number of ISDN links or, for example, one or more conventional telephony links or one or more broadband links. In this sense, the remaining 6 B channels of the SDSL frame in the exemplary embodiment of FIG. 4 are combined to form a 384 kbit/s broadband link which is available simultaneously with the ISDN link. In this example, the operational control bits for both links are transmitted in the eoc channel.

The digitized data of one or more analog telephony links are transmitted in 64 kbit/s channels and in each case precisely one B channel is allocated to one conventional telephony link. The data of one or more broadband links are combined in the number of B channels needed in each case. In this arrangement, the upper limit of the number of B channels defined in FIG. 3 must be adhered to.

In the overhead section OH (see FIG. 3) of the SDSL frame, the SDSL overhead data are accommodated which include status information and an embedded operations channel (eoc) channel, with a transmission rate of about 3.3 kbit/s for operating the SDSL transmission link.

In addition, the SDSL frame includes a 14-bit-wide sync word at the beginning for synchronization and two spare bits at the end of the frame.

FIG. 5 shows a previously known example of an addressing field of the eoc address extension necessary for addressing the individual ISDN links or conventional telephone links and broadband links. This address field exhibits the components service ID and service No. which are necessary for unambiguously addressing the respective link. In this arrangement, a certain service No. is addressed within a service type (e.g. one of a multiplicity of ISDN links).

In another exemplary embodiment according to the invention, the operational control bits for the SDSL transmission link, particularly the call control bits for one or more telephony links, are transmitted in one or more 8 kbit/s Z channels. As a result, this information can be transmitted to the remote line end of the SDSL link at least 2.5 times faster than in the conventional eoc channel. The resultant gain in time is decisive for simultaneous control of a multiplicity of conventional telephony links at the correct time via a common SDSL transmission link.

Figure 6:
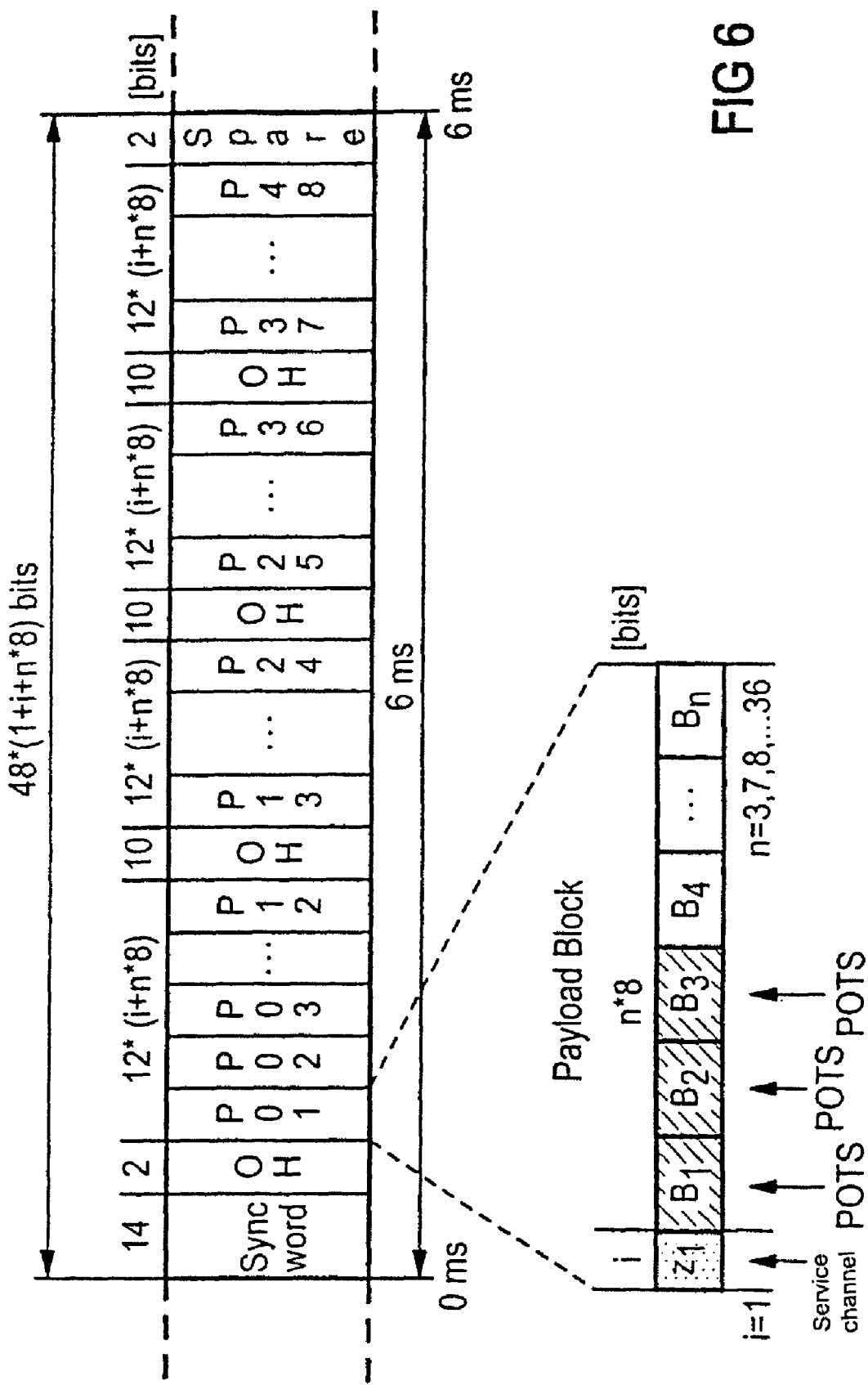
FIG. 6 shows another exemplary embodiment of the structure of an SDSL frame.

FIG. 6 shows an exemplary embodiment according to the invention in which the digitized data of three conventional telephony links are combined in three B channels with in each case 64 kbit/s, and the associated call control bits are combined in one Z channel with 8 kbit/s, within an SDSL frame. The number of telephone links operated simultaneously on an SDSL link can still be increased considerably since the SDSL frame according to FIG. 3 can include up to 36 B channels and up to 8 Z channels.

At present, applications of this type have once again gained the interest of the network operators since they can be implemented particularly inexpensively with the symmetric time-division multiplex structure of the SDSL system and since the conventional telephony service is still head of the multimedia services by a wide margin with regard to the amount of utilization. In this connection, the object arises to render visible particularly time-critical features of the telephony service such as, for example, calling line identification presentation, at the correct time even with a high call loading due to a multiplicity of telephony connections.

In the embodiment according to the invention, these objects are achieved with the transmission of the call control bits in one or more Z channels.

In another embodiment of the invention, a switch-over between the use of the eoc channel, on the one hand, and one or more Z channels, on the other hand, for the operational control bits is effected as required during the start-up procedure. This is of advantage, for example, if it is intended to guarantee that time-critical conditions will be adhered to for a multiplicity of simultaneous telephony connections or if the time conditions in the eoc channel are sufficient for one or a few telephony connections to be operated simultaneously and the Z channels becoming available are also to be used for transmitting user data.

In still another advantageous embodiment, the same message format as in the eoc channel is used for message coding and addressing in the eoc channel and in the Z channel or channels. This particularly simplifies the circuitry for the operational change between using the eoc channel and the Z service channel or channels.

In yet another embodiment, the use of the eoc channel or of the Z channel or channels and the use of the individual sub-channels of the SDSL frame in the terminating unit at the far line end, preferably in the network terminating unit (NT), is defined within the start-up procedure during the SDSL connection set-up by the LT unit.

The invention claimed is:

1. A data communication method comprising:
    combining data for a plurality of terminals together with telephony call control bits associated with the plurality of terminals into a frame in digital time division multiplex, the frame comprising subframes that comprise an overhead portion and a payload portion, wherein the combining comprises, in at least one of the subframes, allocating the telephony call control bits associated with the plurality of terminals to one or more Z channels of the payload portion; and
    transmitting the frame at a transmitting end.

2. The data communication method of claim 1, further comprising:
    receiving the frame at a receiving end; and
    splitting up the data of the frame.

3. The data communication method of claim 1, wherein the overhead portion comprises an Embedded Operations Channel (EOC).

4. The data communication method of claim 3, wherein a same message format is used for message coding and addressing in the EOC, and for message coding and addressing in at least one of the one or more Z channels.

5. The data communication method of claim 1, wherein
    allocation of the one or more Z channels and use of individual subchannels of the frame is signalled from a network node to a network terminating unit at a far line end; and
    the allocation is defined in the network terminating unit within a start up procedure while a connection is being set up.

6. The data communication method of claim 1, wherein the frame comprises broadband and narrowband data.

7. A data communication method, comprising:
    combining data for a plurality of terminals together with telephony call control bits associated with the plurality of terminals into a digital subscriber line (DSL) frame in digital time division multiplex, the frame comprising subframes that comprise an Embedded Operations Channel (EOC) and one or more Z channels;
    allocating the telephony call control bits associated with the plurality of terminals selectively to the one or more Z channels or the EOC; and
    transmitting the frame at a transmitting end.

8. The data communication method of claim 7, wherein a transmission rate of each of the one or more Z channels is higher than a transmission rate of the EOC.

9. A network system comprising a transceiver, the transceiver configured to:
    combine data for a plurality of terminals together with telephony call control bits associated with the plurality of terminals into a frame in digital time division multiplex, wherein the frame comprises a plurality of subframes that comprise an overhead portion and a payload portion;
    allocate the telephony call control bits associated with the plurality of terminals to one or more Z channels of the payload portion in at least one of the plurality of subframes; and
    transmit the frame.

10. The network system of claim 9, wherein the overhead portion comprises an Embedded Operations Channel (EOC).

11. The network system of claim 10, wherein a same message format is used for message coding and addressing in the EOC, and for message coding and addressing in at least one of the one or more Z channels.

12. The network system of claim 9, wherein the transceiver is further configured to:

perform signal allocation of the one or more Z channels and a use of individual subchannels of the frame to a terminating unit at a far line, wherein the allocation is defined in the terminating unit within a start up procedure during a connection set up.

13. The method of claim 7, wherein the DSL frame comprises a Symmetric DSL frame.

14. The method of claim 7, wherein the DSL frame comprises a SDSL frame.

15. A network system comprising a transceiver, the transceiver configured to:

combine data for a plurality of terminals together with telephony call control bits associated with the plurality of terminals into a frame in digital time division multiplex, the frame comprising subframes that comprise an Embedded Operations Channel (EOC) and one or more Z channels;

allocate the telephony call control bits associated with the plurality of terminals selectively to the one or more Z channels or the EOC in at least one of the subframes; and transmit the frame.

16. The network system of claim 15, wherein a transmission rate of each of the one or more Z channels is higher than a transmission rate of the EOC.

17. A data communication method comprising:

combining data transmitted by a plurality of terminals over a narrowband network and a broadband network, with telephony call control bits associated with each of the data transmissions from the plurality of terminals, into a frame in digital time division multiplex, the frame is divided into multiple subframes comprising an overhead portion and a payload portion, wherein the combining comprises in each subframe, allocating telephony call control bits of one data transmission to one or more Z-channels of the payload portion and the respective data of the one data transmission to the rest of the payload portion that is not in the Z-channels.

18. A data communication method comprising:

combining data transmitted by a plurality of terminals over a telephony network and a broadband network, with telephony call control bits associated with each of the data transmissions from the plurality of terminals, into a frame in digital time division multiplex, the frame is divided into multiple subframes comprising an overhead portion and a payload portion, wherein the combining comprises in each subframe, allocating telephony call control bits of one data transmission to one of more Z-channels of the payload portion and the respective data of the one data transmission to the rest of the payload portion that is not in the Z-channels.

\* \* \* \* \*